A. D. STANDEFORD.
SHUTTER FOR MOTION PICTURE MACHINES.
APPLICATION FILED DEC. 21, 1911.

1,091,543.

Patented Mar. 31, 1914.

WITNESSES:
R. E. Hamilton
E. C. Lillian

INVENTORS:
Archie D. Standeford,
BY F. G. Fischer
ATTORNEY

UNITED STATES PATENT OFFICE.

ARCHIE D. STANDEFORD, OF KANSAS CITY, MISSOURI.

SHUTTER FOR MOTION-PICTURE MACHINES.

1,091,543.  Specification of Letters Patent.  Patented Mar. 31, 1914.

Application filed December 21, 1911. Serial No. 667,074.

*To all whom it may concern:*

Be it known that I, ARCHIE D. STANDEFORD, a citizen of the United States, residing at Kansas City, in the county of Jackson and State of Missouri, have invented certain new and useful Improvements in Shutters for Motion-Picture Machines, of which the following is a specification.

My invention relates to new and useful improvements in shutters for motion picture machines, and my object is to provide a shutter of this character whereby the period of non-exposure of the pictures may be reduced to a minimum, to the end that said pictures may be projected upon a screen with greater clearness and brilliancy than heretofore, and without the usual flicker incident to comparatively long periods of nonexposure.

It is well known among those conversant with the art that the elimination of flicker in pictures depends upon the period of nonexposure. The longer the period of nonexposure, the greater the contrast between light and darkness, and the greater the flicker. Owing to the comparatively long travel of the ordinary shutter, to cover or uncover the picture, the period of darkness cannot be reduced, because a longer period of exposure would blur the picture on account of exposure of the film during the period of movement. I overcome this difficulty with my new shutter by reducing the travel thereof to a minimum, so that the period of nonexposure will likewise be reduced to a minimum. Owing to the short travel of my improved shutter, the interrupting wings sometimes employed in addition to the usual main shutter for the purpose of dividing the period of exposure to further reduce the flicker, may be dispensed with, as my shutter also performs said purpose.

A further advantage obtained by using my shutter is, that it permits a certain amount of light to be projected upon the screen during nonexposure of the picture, and hence the usual great contrast between light and darkness, so detrimental to the eyesight, is obviated.

Figure 1:
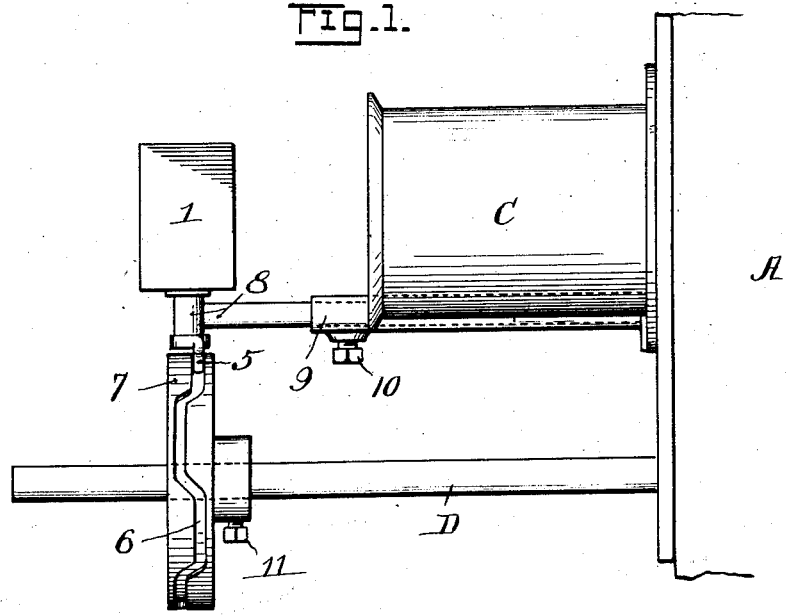
Figure 2:
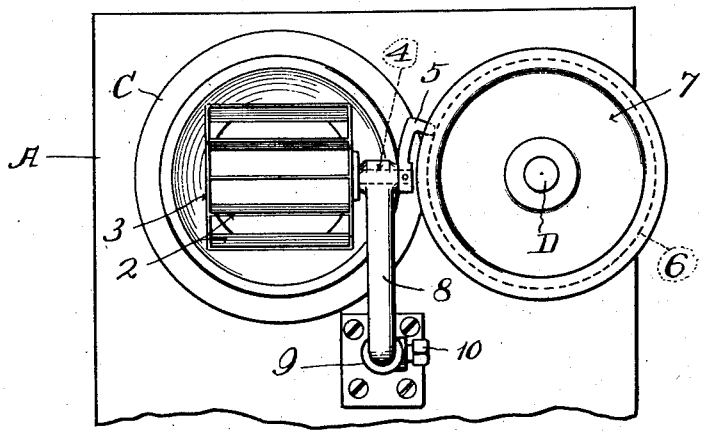
Figure 3:
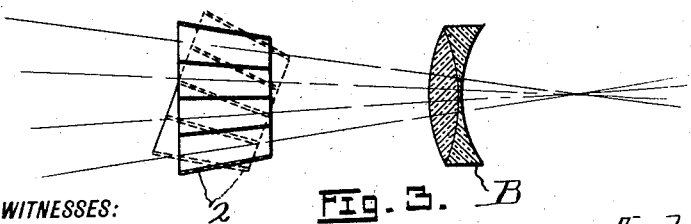

In order that the invention may be fully understood, reference will now be made to the accompanying drawing, in which: Figure 1 is a broken plan view of a moving picture machine provided with my improved shutter. Fig. 2 is a front elevation of the same. Fig. 3 is a diagram of my improved shutter in relative position to the objective lens of the moving picture machine.

A designates the casing of a moving picture machine of any ordinary or preferred type provided at its forward side with an objective lens B inclosed in a mounting C, fixed to the front side of casing A.

1 designates my improved shutter, arranged in front of lens B and its mounting C, as shown in Fig. 1. Shutter 1 comprises a plurality of blades 2, united by a pair of side pieces 3, one of which has a centrally-disposed laterally-projecting rock-shaft 4, provided with a crank-arm 5, entering the peripheral groove 6 of a wheel 7. Rock-shaft 4 is mounted in the upper end of a telescopic bracket comprising a right-angle section 8 and a tubular section 9, the former being slidably-mounted in the latter and provided with a set-screw 10 to engage and lock section 8 at any point of its adjustment in section 9, which is secured to the front end of casing A. Said adjustable bracket permits the shutter to be adjusted forward or backward to accommodate lenses of different focus.

Groove 6 is, substantially, zigzag in shape, as shown in Fig. 1, to carry crank-arm 5 back and forth and oscillate the shutter 1.

Wheel 7 is adjustably-mounted upon a shaft D, so that it may be adjusted backward or forward with the shutter to bring the same into proper relation with the rays of light projected by lens B upon the screen (not shown), said wheel being secured at any of its adjusted positions by a set-screw 11. Shaft D is driven at high speed by the gearing which controls movement of the film (not shown). This speed is predetermined, so that the grooved wheel 7 will throw the shutter to the dotted position Fig. 3, and shut off the rays of light during movement of the film. The speed is such as to also throw the shutter to the dotted position one or more times during exposure of a picture, and owing to the exceedingly short travel of the shutter, the resultant periods of darkness are so short as to be imperceptible to the eye, with the result that flickering of the picture on the screen is eliminated. The necessary movement of the shutter is dependent upon the number of blades which it contains, it being obvious that the movement may be diminished as the number of blades is increased, and vice versa. As the blades are exceedingly thin and divergingly arranged to correspond with the rays of light projected through lens B, they will not obstruct said rays sufficiently to be perceptible to the eye.

If desired, the movement of the shutter may be shortened to allow a portion of the light to be thrown on the screen during the period of nonexposure of the picture, and thus obviate the decided contrast between total darkness and brilliant light common where the ordinary type of shutter is employed.

While I have shown and described the preferred construction of my invention, I do not wish to be confined to the exact construction and arrangement of the parts as shown, but reserve the right to make such changes as properly fall within the spirit and scope of the appended claims.

Having thus described my invention what I claim, and desire to secure by Letters Patent, is:

1. In an apparatus of the character described, a shutter consisting of a plurality of blades arranged edgewise in the rays of light projected from the apparatus, a suitably-mounted rock-shaft fixed to said shutter, and means to actuate said rock-shaft.

2. In an apparatus of the character described, a shutter consisting of a plurality of blades arranged edgewise in the rays of light projected from the apparatus, a suitably-mounted rock-shaft fixed to said shutter, a crank-arm fixed to said rock-shaft, and a rotary wheel having an irregular groove, the sides of which actuate said crank-arm.

3. In combination with a picture projecting machine, a shutter consisting of a plurality of blades arranged edgewise in the rays of light projecting from said picture machine, and means controlled by said picture machine, to oscillate said blades to periodically interrupt the rays of light.

In testimony whereof I affix my signature, in the presence of two witnesses.

ARCHIE D. STANDEFORD

Witnesses:
F. G. FISCHER,
E. C. LILLIAN.